United States Patent [19]

Tolle

[11] 4,057,956

[45] Nov. 15, 1977

[54] RUBBER COVERED CABLE

[76] Inventor: Russell W. Tolle, 4032 Johnson Road, P.O. Box 721, Chanute, Kans. 66720

[21] Appl. No.: 667,507

[22] Filed: Mar. 17, 1976

[51] Int. Cl.² .............................................. D07B 1/16
[52] U.S. Cl. ...................................... 57/164; 57/149; 57/153; 57/162; 156/51
[58] Field of Search ................ 57/149, 145, 153, 162, 57/164; 156/47, 48, 51

[56] References Cited

U.S. PATENT DOCUMENTS

| | | | |
|---|---|---|---|
| 2,067,405 | 1/1937 | Mayne | 57/149 X |
| 3,131,530 | 5/1964 | Dietz | 57/149 |
| 3,413,186 | 11/1968 | Marzocchi | 57/164 X |
| 3,425,207 | 2/1969 | Campbell | 57/149 X |
| 3,443,374 | 5/1969 | Carnevale | 57/162 X |
| 3,534,542 | 10/1970 | West | 57/145 |
| 3,589,121 | 6/1971 | Mulvey | 57/162 |
| 3,756,008 | 9/1973 | Smith | 57/139 |
| 3,893,642 | 7/1975 | Vlaenderen | 57/153 X |

FOREIGN PATENT DOCUMENTS

| | | | |
|---|---|---|---|
| 153,167 | 11/1951 | Australia | 57/147 |
| 881,763 | 5/1953 | Germany | 57/145 |

Primary Examiner—Donald Watkins
Attorney, Agent, or Firm—Fishburn, Gold & Litman

[57] ABSTRACT

A flexible, high strength steel cable having a continuous, flexible outer covering of vulcanized rubber thereon is disclosed. The rubber coating makes the cable easier to handle and use, and reduces flaring of the wires when the cable is cut. There is less tendency for the cable to slip when wrapped around objects to be secured and/or lifted, and marring of such objects by the cable is reduced. In addition to these advantages, the coating on the cable protects the steel substrate from corrosion during weathering, exposure to sea water, or contact with corrosive chemicals. Vulcanization of the rubber coating is carried out at high pressure to provide it with a high Durometer hardness and other desirable properties.

8 Claims, 5 Drawing Figures

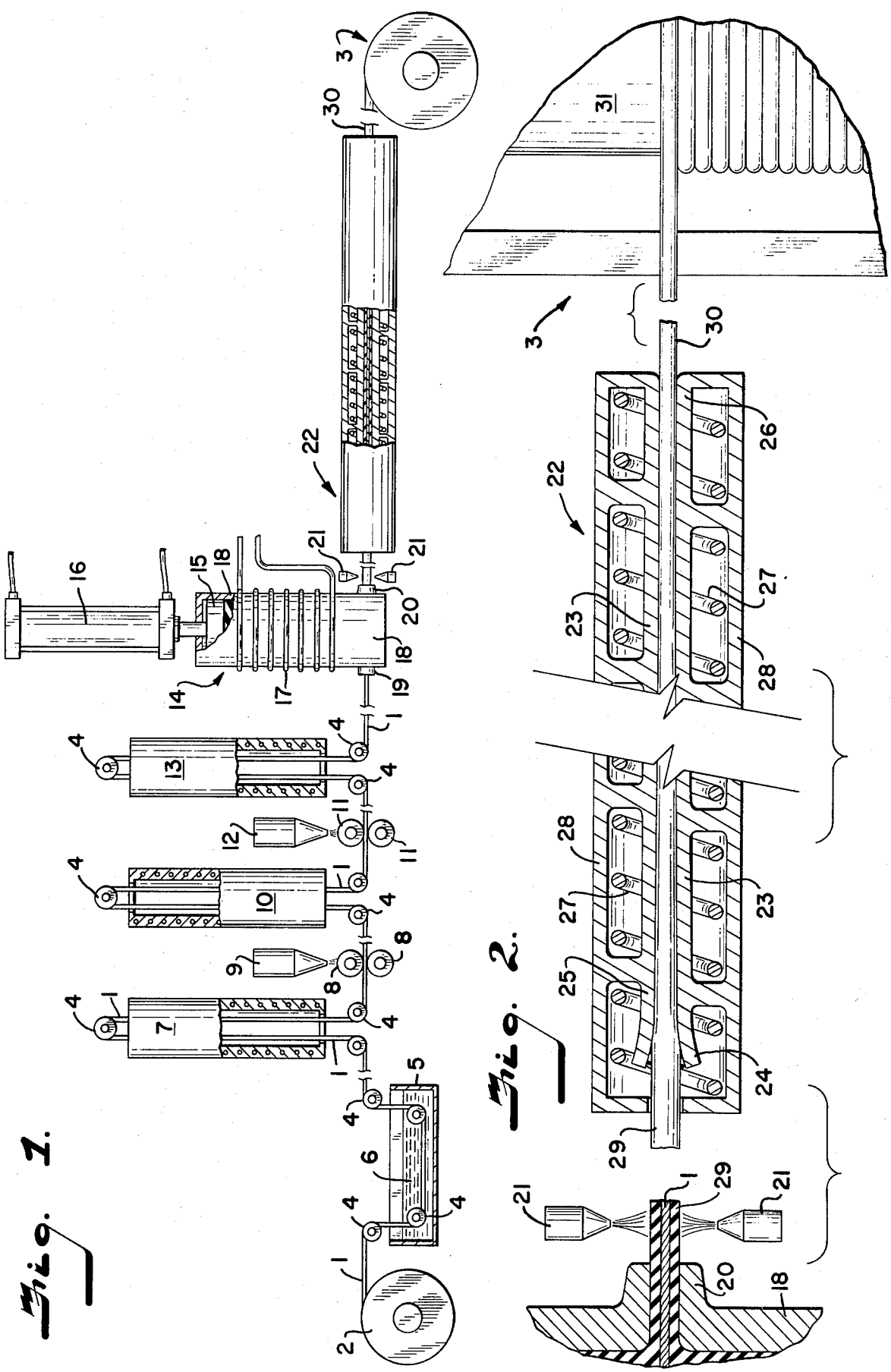

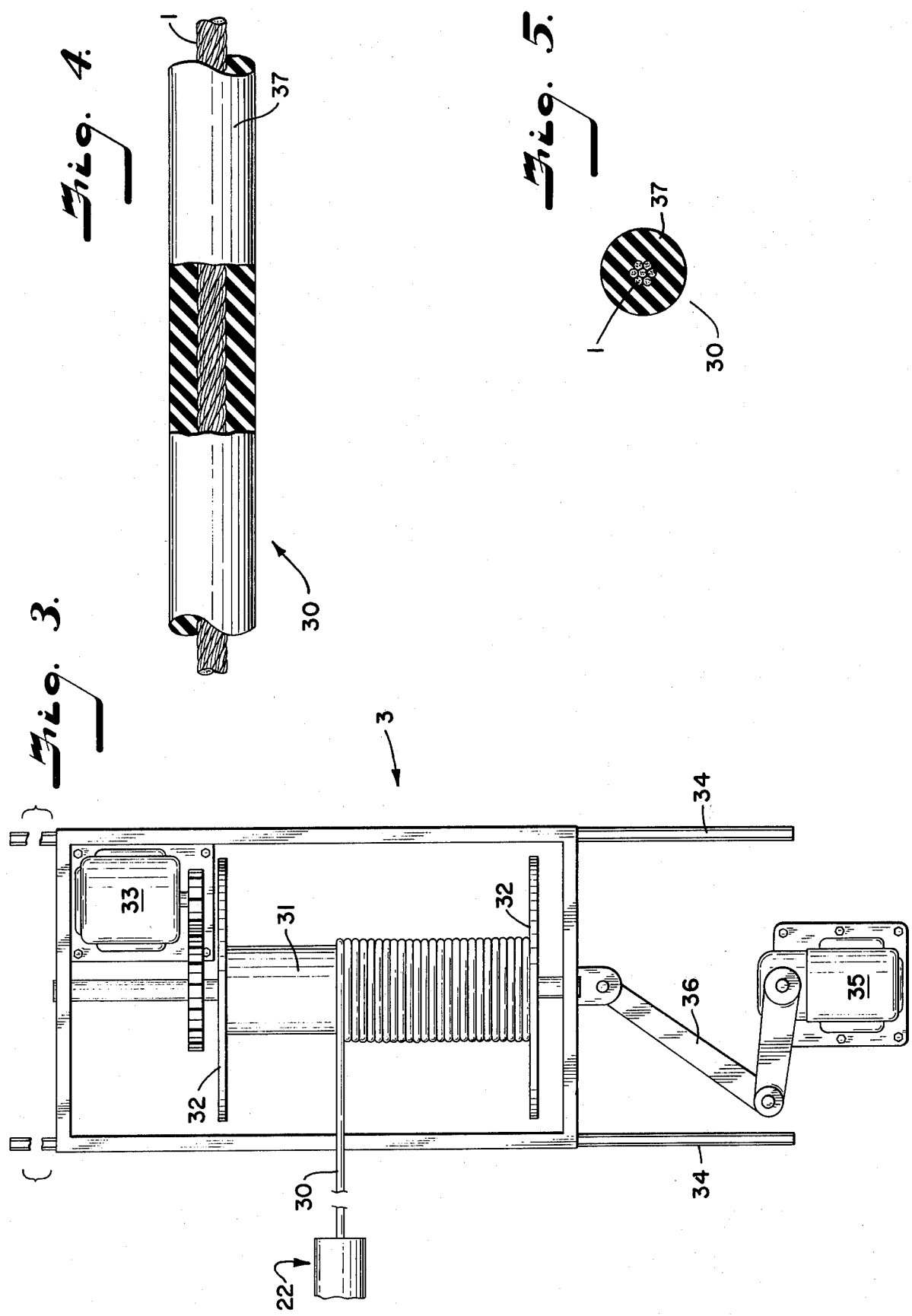

RUBBER COVERED CABLE

BACKGROUND OF THE INVENTION

The present invention pertains to improvements in flexible, high tensile strength steel cables which are used, inter alia, for securing, lifting, towing or pulling objects at conditions under which a cable must withstand a heavy physical load. More specifically, the present invention pertains to flexible, high tensile strength steel cables having a protective outer covering thereon and to methods of producing such cables.

Cables made of stranded steel wire are relied upon in many commercial and industrial applications for securing, towing or lifting of heavy objects, or for otherwise repeatedly or continuously applying motive force to an object where extreme reliability of force transfer is essential, e.g. cables required for moving aircraft control surfaces, and for brakes, wenching, lifting and towing.

Steel cables are extensively used for the aforementioned purposes, and although no satisfactory substitute for such cables has yet been devised, they nonetheless have certain disadvantages and objectionable characteristics. Individual wires or strands of the cable can flare outward when the cable is cut, thus creating a hazard to workmen. Furthermore, since the cable is made of steel which is relatively hard and tough, it has a tendency to slip across the surface of an object around which it is wrapped, or from which the object is slung, such as a capstan or a heavy object to be lifted or towed. Contrariwise, if the object being secured or pulled by the cable is made of a softer material, the cable tends to scuff or scrape the surface of the object, and hence mars its surface.

Another problem that is encountered is that the wires in the strands of the cable become worn and eventually break as a result of the cable repeatedly rubbing against itself or, more seriously, being dragged over sharp or abrasive objects. In an attempt to protect the cable, not only against cutting and abrasion of the wires but also from corrosion, it must be periodically coated with grease or a heavy oil. This provides protection which is frequently inadequate, and which at best is only temporary, not to mention the difficulty of handling and the mess that it causes.

The primary object of the present invention is, therefore, to provide a flexible, high tensile strength cable comprising an improvement whereby the previously mentioned disadvantages and objectionable features are either eliminated or alleviated.

Another object is to provide a flexible, high tensile strength steel cable having a flexible, continuous coating of a vulcanized rubber thereon.

Still another object is to provide a flexible, high tensile strength steel cable having a reduced tendency to slip on surfaces of an object around which the cable is wrapped, and which is less inclined to blemish the surfaces.

Yet another object is to provide a flexible, high tensile strength steel cable having a coating thereon whereby contact of the wires of the cable against one another and with sharp or abrasive objects is prevented.

Even another object is to provide a flexible, high tensile strength steel cable with a coating thereon which protects the wires of the cable from rust and corrosion.

Another object is to provide a flexible, high tensile strength steel cable with a coating thereon which prevents flare of the wires of the strands when the cable is cut.

Still another object is to provide a process for producing a flexible, high tensile strength, steel cable having a protective coating of vulcanized rubber thereon.

Other objects and advantages of the present invention will become apparent from the following description and the appended claims.

SUMMARY OF THE INVENTION

The present invention is a flexible, high tensile strength steel cable having a continuous outer coating of flexible, vulcanized rubber bonded thereto. The cable can be produced by first applying a vulcanizable rubber compound to the outer surface of the steel cable and then exposing the cable with the rubber compound thereon to selected time, temperature and pressure conditions to effect curing of the rubber compound and bonding thereof to the steel wires of the cable.

BRIEF DESCRIPTION OF THE DRAWINGS

FIG. 1 is a schematic side elevational view illustrating one process embodiment of the present invention.

FIG. 2 is an enlarged, partially fragmented, side-sectional view of a heated tubular die used in the process illustrated in FIG. 1.

FIG. 3 is a top view of a motor driven wench used in the process illustrated in FIG. 1 to pull the covered cable through the coating and curing apparatus and to wind the produced cable on a reel.

FIG. 4 is a side view, partly in section, of a cable produced in the process illustrated in FIG. 1.

FIG. 5 is a cross-sectional view of the cable shown in FIG. 4.

DESCRIPTION OF PREFERRED AND ALTERNATIVE EMBODIMENTS

In preferred embodiments of the present invention the flexible, high tensile strength steel cable comprises a plurality of elongated, twisted strands which are made up from fine steel wires, e.g. 3 to 19 wires per strand. The wires can be stainless steel, but more commonly will be high carbon steel. It is preferred that the wires of the strands be brass plated.

The compounding recipe and curing conditions employed for providing the flexible, vulcanized rubber coating on the cable is subject to considerable variation depending upon the combination of physical properties and chemical resistance sought for the vulcanizate, and in preferred embodiments of the invention the vulcanized polymer coating will have tensile, modulus and elongation properties which are relatively high, along with a high hardness and a low brittle point. It is preferred that the rubber compound, when vulcanized, have a tensile strength of at least about 2500 psi, that the 300% modulus be at least about 1000 psi, and that the elongation thereof be at least about 475%. It is also preferred that the Shore A Durometer hardness of the vulcanized rubber be at least about 65 ±5, and that the brittle point thereof be at least about −65° F, or lower. It is also advantageous that the acetone extract of the rubber compound not exceed about 20%. A Government Grade Off-The-Road rubber compound is a preferred polymer compound for coating the steel cables of this invention. One recipe for an off-the-road tire rubber compound is shown in Table 1.

TABLE-1

| Ingredient | Off-The-Road Rubber Recipe Parts by Weight |
|---|---|
| Natural Rubber, Liberian Pale Crepe | 100 |
| Carbon Black, ISAF-LM (N-231) | 50 |
| Zinc Oxide | 5 |
| Stearic Acid | 3 |
| Age Rite Resin D | 2.0 |
| Sulfur | 1.8 |
| Santocure NS | .8 |

Note: Where preferred, from about 10-15 parts by weight of precipitated silica pigment can be substituted for about 10-15 parts of the carbon black, and other or different amounts of ingredients can be used in the recipe when such is preferable and practical.

It is advantageous that the polymer compound used for coating the cable contain carbon black as a reinforcing pigment, preferably in loadings of at least 30 parts by weight for each 100 parts by weight of rubber, for imparting high strength and abrasion resistance to the vulcanized cable coating. Where preferred, a rubber-to-metal bonding agent can be emplaced between the steel cable and the rubber compound in order to enhance the bonding strength between the two.

It will be appreciated that the rubber compound used for coating the cable is formulated and cured to provide physical and chemical properties that are different from those required for coating electrical cables made of copper, aluminum, etc., where the electrical conductivity of the coating must be very low. Wire insulation compounds are typically made of thermoplastic resins such as polyvinyl chloride, polyethylene, and polytetrafluoroethylene, or oxidation resistant rubbers such as butyl, EPD, EPDM, blends of such rubbers, and blends thereof with polyolefins such as polyehtylene or EVA. Mineral fillers having low electrical conductivity, such as clays and fine silicas, have been used in wire insulation compounds for further enhancing the physical and chemical properties thereof. Regardless, the polyolefins, PVC and PTFE resins have provided coatings, which though quite tough and resistant to chemical attack, are slippery in comparison to flexible rubber and do not bond well to the electrically conductive wire of the cable. On the other hand, rubber compounds filled with mineral fillers are frequently too soft, can age quickly if exposed to the weather, and have tensile strength, modulus and elongation values which are far too low for stress-strain and abrasive conditions that will be encountered when applied as a coating on a steel cable that is used for pulling, lifting or securing of heavy objects. It will therefore be understood that formulation and curing of rubber compounds used for coating cables in the present invention required consideration of the physical and chemical conditions to which the cable is exposed when placed in use. The vulcanized coating should be somewhat deformable to help overcome both slipping of the cable and also marring of an object around which it is wrapped, but should nonetheless be quite hard, to the extent that flexible rubbers can be, to prevent tearing and rapid wearing of the coating during normal conditions of use. Advantageously, therefore, the cable coating can be at least one-eighth of an inch thick, and preferably thicker, e.g. 3/16 ¼, ½ inch thick, or even thicker depending on the diameter of the steel cable that is covered.

The term "rubber compound" as used herein is intended to mean compounds wherein the base polymer is one or more rubbers, or wherein a major portion of one or more rubbers is in mixture with a minor portion of one or more nonrubber polymers. Various rubbers, or blends of a rubber with another compatible rubber or thermoplastic resin can thus be used as the rubber of the coating compound, exemplary rubbers being butadiene-styrene, polybutadiene, EPR, EPDM, butyl, chlorobutyl, neoprene, polyisoprene, and natural. Thermoplastic resins which can be blended with the rubbers, to provide a rubber compound that is predominately rubber, include polyethylene and EVA resins. Good chemical and aging resistance, along with high tensile strength and modulus which provide toughness, can generally be expected from butadiene-styrene, polybutadiene, polyisoprene, and natural rubbers, as well as from blends of such rubbers, when they are compatible with each other. Butyl, chlorogutyl, EPR, EPDM, neoprene rubbers and compatible blends thereof generally provide higher resistance to heat and/or chemical attack.

The use of a rubber reinforcing carbon black, such as an FEF, HAF, ISAF or SAF grade for instance, enhances strength and toughness of the vulcanized rubber compound and greatly increases its resistance to aging, tearing and abrasion. Therefore, the type and amount of carbon black incorporated into the rubber can vary in accordance with the type of rubber and the properties desired of the vulcanizate. A content of at least about 30 parts by weight of carbon black per 100 parts of rubber is generally preferred; more preferably about 30 to about 70 parts by weight of carbon black per 100 parts of rubber.

Preferred rubbers, which can be used with these proportions of carbon black, are natural rubber, butadiene-styrene rubber, polybutadiene rubber, blends thereof, and especially natural rubber.

It should be pointed out that in accordance with the present invention a rubber compound which contains carbon black is applied to the steel of the cable as a coating without any form of insulating layer between the steel and the coating or on the outside of the coating. It is not practical to use rubber compounds containing 30 or more parts of carbon black for each 100 parts of rubber when coating electrical cables for the purpose of insulating and protecting them, since carbon black renders the vulcanized rubber far more electrically conductive than the mineral fillers used in wire insulating compounds. It will therefore be emphasized once again that the rubber compound employed in the present invention for coating flexible, high tensile strength steel cables are different from those used for electrically insulating wires and cables, and they are intended instead for protecting cables which must withstand high physical loads during conditions of use that are entirely different from those normally encountered by electrical cables.

As was previously indicated, a tire rubber compound can be used as a coating for the cable since it can provide a degree of toughness, bonding, abrasion resistance and corrosion resistance that is desired for protecting the cable against physical and chemical damage.

In producing the presently disclosed coated cable, a vulcanizable rubber compound can first be applied to the steel cable, the rubber compound can then be vulcanized, and a steel cable having a continuous, flexible, vulcanized rubber coating bonded thereto can thereafter be recovered by winding on a reel. In such a process, the cable having the vulcanizable rubber thereon can be simultaneously heated and compressed along its length for vulcanization of the coating compound and to strengthen the bond between the polymer and the metal of the cable. To advantage, the coating of rubber compound can be compressed during vulcanization to a pressure of at least about 700 psi, and it is preferred that the thickness of the rubber coating on the cable be permanently reduced by the compression and curing thereof so that the produced cable has a diameter significantly smaller than prior to the compression and heating thereof, e.g. a diameter of at least 10% less. It is preferred that the pressure and temperature applied to the cable during curing of the rubber coating, and the time to which the cable is exposed thereto, be selected to provide a cable with a cured coating thereon having the previously stated preferred values of Shore A Durometer hardness, tensile strength, modulus, and elongation.

Application of the vulcanizable rubber to the cable and the curing thereof can be carried out in two successive steps. The rubber can be applied to the steel cable by pulling it through the extrusion orifice of a polymer extruder while simultaneously extruding the unvulcanized rubber compound from the orifice onto the surface of the steel cable. Subsequently, the rubber compound thus applied to the cable can be cured thereon in any suitable fashion, but there is advantage in pulling the coated cable through an elongated tubular die which is heated and which has an inside diameter significantly smaller than the diameter of the coated cable prior to being pulled through the die. Accordingly, the cable can be compressed and heated both for curing of the rubber coating and reducing the thickness thereof, as previously described, all for the purpose of providing a cable coating of desired strength, hardness, and resistance to abrasion and chemical attack.

If the bonding strength between the metal and the rubber compound need be greater than is effected by means of applying and curing the rubber compound while in direct contact with the wire of the cable, a rubber-to-metal bonding agent can be applied to the wire prior to application of the polymer compound thereto. Various bonding agents can be employed, one suitable version being an adhesive marketed under the tradename Chemlok 220 by the Hughson Chemical Company, and which is described as being organic polymers and dispersed fillers in a xylene and perchloroethylene solvent system. Where preferred, a primer such as Chemlok 205 can be applied to the steel wire ahead of the adhesive, and this material is described as being a mixture of polymers, organic compounds and mineral fillers in a methyl isobutyl ketone and Cellosolve solvent system. Also, as was previously indicated, the bonding of the polymer compound to the steel cable is improved when the wires of the strands of the cable have previously been coated with brass.

The invention will be further described with reference to the drawings, a preferred processing technique for producing the cable being illustrated therein. Although reference will be made to specific materials and conditions, it will nonetheless be understood that other materials and processing conditions can also be used.

In FIG. 1, a flexible, high strength steel cable 1 is unwound from a reel 2 by pulling the cable from the other end by means of a wench represented at 3. The cable is guided through the processing apparatus by a series of pulleys 4. As the cable leaves the reel 2, it first enters a vat 5 which contains a degreasing liquid, represented at 6, which strips grease and/or oil from the cable. Preferred degreasing liquids are organic solvents, although detergent liquids can be used, and trichloroethylene is a preferred organic solvent. Upon leaving the vat 5, the cable passes into a first drying tunnel, represented at 7, for vaporization and removal of the degreasing liquid therefrom. From the dryer 7, the cable passes through a first set of soft rollers 8, onto which a primer is fed from a primer reservoir 9, and the cable is thereby coated with primer prior to being passed into a second tunnel dryer 10 for vaporization and removal of the solvent of the primer. Upon leaving the second dryer 10, the cable passes through a second set of soft rollers 11 onto which a rubber-to-metal adhesive is fed from adhesive reservoir 12. The cable is coated with adhesive by rollers 11 and it is then conveyed into a third drying tunnel 13 for vaporization and removal of solvent of the adhesive. Upon leaving the dryer 13, the cable is drawn into and through a polymer extruder, represented at 14. The extruder comprises a barrel 18 into which a vulcanizable rubber compound is charged through a feed inlet (not shown) and is compressed therein by means of a piston 15 that is driven downward with a hydraulic cylinder 16. The barrel of the extruder is heated by means of an electric or steam heating coil 17 to effect softening, but not curing, of the vulcanizable rubber compound contained in the barrel. Below the piston 15, the extruder barrel has a sealing inlet 19 for cable 1, and this inlet is axially aligned with a circular extrusion orifice 20 through which the cable is drawn by wench 3 while the vulcanizable rubber compound is simultaneously being extruded from the orifice onto the surface of the cable. The cable is centrally aligned in the circular orifice 20 while it is being pulled through it, so that the cable thus becomes uniformly coated with the rubber compound. The thickness of the deposited coating is determined by the inside diameter of the orifice, i.e. use of a larger diameter provides a thicker coating, and vice versa.

Upon leaving the extruder orifice, the coated cable is sprayed with a silicone oil by jets 21 and is then drawn into an elongated tubular die, represented at 22, which is shown in greater detail in FIG. 2. The elongated heating tube 23 of the die has a flare 24 at the inlet end 25 thereof, and the internal diameter of the tube is larger at the inlet end than at the outlet end 26. An electric heating coil 27 surrounds the tube 22, and a protective metal cover 28 surrounds both the tube 22, and the coil 27. A layer of thermal insulation can be applied to the outside of cover 28 when the use of such is preferred.

The cable 1 leaving orifice 20 has a coating 29 thereon of unvulcanized rubber compound, and the thickness of the coating is dependent upon the outside diameter of the cable 1 and the inside diameter of orifice 20. In any case, the diameter of cable 1 and the coating 29, combined, is smaller than the largest diameter of the flare 24, thus funneling the coated cable into the elongated tube 23. The inlet end 25 of the tube has an inside diameter approximately the same or slightly smaller than the coated cable, but the inside diameter of the tube converges along its length, thereby causing the coating 29 to become compressed as the cable is drawn through the tube by wench 3. Also, as the cable 1 and coating 29 are drawn through the tube 23, the coating is heated by transfer of heat from heater coil 27 through the tube. The coating 29 is thus simultaneously heated and compressed to effect vulcanization and size reduction thereof during transit through the tube.

Conditions of time, temperature, and pressure to which the coated cable is subjected during transit through the tubular die is subject to variation depending on the thickness and composition of coating 20, e.g. thicker coatings require longer curing times, and curing time will further depend upon the type of rubber and the vulcanizers, accelerators, etc., incorporated into the rubber compound. Compression of the coating during the curing and drawing thereof within tube 1 is preferred for producing a dense, hard, and yet flexible cable coating. Accordingly, pressures of at least about 700 psi can be used to advantage, and as a consequence, the diameter of the produced coated cable leaving the outlet end 26 of the tube 23 is significantly less than prior to the compression and heating of the cable for vulcanization of the coating 29. To produce a coating of high hardness, the diameter of the coated cable is thus reduced by at least about 10%. As an example, a ¼ inch cable having a 5/16 inch coating of polymer thereon can be reduced from a diameter of ⅞ inch to ¾ inch during compression and heating of the cable in the tubular die 22, thus reducing the diameter of the cable by about 14% and the thickness of the coating by 20%.

Referring to FIG. 3, the cable having a vulcanized coating thereon 30 is drawn out of tubular die 23 by the wench 3 and is wound on the drum 31 of a cable reel having cable retainer plates 32 at the end of the drum. The cable reel is rotated for winding of coated cable 30 thereon by means of a gearmotor 33. The entire wench assembly 3 is mounted on tracks 34 and is reciprocated back and forth at a controlled, variable speed by means of another gearmotor 35 and crank assembly 36 to effect a smooth, uniform winding of the cable on the drum. When the cable 30 has been wound on the cable reel to the outer periphery of plates 32, the reel is removed from the wench for storage and is replaced by an empty reel.

As shown in FIGS. 4 and 5, a cable of the present invention comprises a flexible, high tensile strength steel cable 1, and a continuous, flexible outer covering 37 of vulcanized polymer compound. In the illustrated case, the cable 1 comprises a central strand surrounded by six other strands, and with each strand being made up from a plurality of fine wires. It should also be noted that no separate coating exists between the rubber coating 37 and the cable, or on the outside of the coating 37. The use of a very thin primer and/or adhesive coating on the cable notwithstanding, the cable is thus protected by means of the single coating 37.

EXAMPLE

Using an apparatus arrangement substantially in accordance with that shown in the drawings, a ¼ inch diameter 7 × 19 steel cable was coated in accordance with the present invention. The wire of the strands of the cable were high carbon steel and were plated with brass. A Government Grade Off-The-Road tire rubber was used to coat the cable.

Bare cable was drawn from reel 2 and passed into vat 4, which contained trichloroethylene solvent, for degreasing the cable. The first dryer 7 was maintained at a temperature of about 160° F for vaporization and removal of the trichloroethylene from the cable. Chemlok 205 primer was applied to the degreased and dried cable by rollers 8, and the solvent of the primer was evaporated and removed therefrom by maintaining the second dryer 10 at about 160° F. The primed cable passed through rollers 11 and was thus coated with Chemlok 220 adhesive, and the solvent of the adhesive was vaporized and removed by means of the third dryer 13 at temperatures of about 160° F. A layer of primer and a layer of adhesive, each about 3 to 4 mils thick, were thus applied to the cable before it was drawn through the extruder 14 for application of the rubber coating. The unvulcanized rubber compound was heated and thus softened in the barrel 18 of the extruder prior to being extruded through the ⅞ inch orifice 20 thereof. The diameter of the cable with the polymer coating thereon was thus ⅞ inch, and entered tubular die 22 at that diameter and exited therefrom at a diameter of ¾ inch.

The tubular die had a heated length of 10 feet, and the rubber coating of the cable was heated in tube 23 to a temperature of 300°–350° F as the coated cable was drawn through the tube at the rate of 1 foot per minute. The rubber coating was vulcanized during transit through the tubular die, and the resulting produced cable having a continuous, uniform, flexible coating of cured rubber bonded thereto was wound on a cable reel by wench 3 as it discharged from the die. The pressure exerted on the cable during transit through die 22 was about 750 psi.

The process just described is continuous, and it will be understood that by use of a polymer extruder having multiple orifices and a series of tubular dies 23 that several cables could be coated simultaneously. It will also be appreciated that the tubular dies 23 can be made longer so that the coated cable can be pulled through and vulcanized at a faster rate without sacrificing curing time needed to effect sufficient vulcanization.

A coated cable product and process has now been described whereby the previously stated objects can be accomplished. Problems associated with the knotting, fraying, and slipping of flexible, high tensile strength steel cable can thus be avoided, while also providing a cable which does not have to be periodically greased, yet which is resistant to cutting and abrasion of the wires and to corrosive attack by such substances as fresh water, sea water, acids and alkalies.

Even though the invention has been described with reference to specific polymers, compounding ingredients, materials, conditions, dimensions, applications, and the like, it will nonetheless be understood that even other embodiments will become apparent which are within the spirit and scope of the invention defined in the following claims.

What is claimed and desired to secure by Letters Patent is:

1. A continuous process for producing a steel cable having an outer coating of vulcanized rubber thereon, comprising:
    a. applying an outer coating of a vulcanizable rubber compound to the outer surface of a flexible, high tensile strength steel cable to provide a coated cable,
    b. pulling said coated cable through a heated die having an inside diameter smaller than the outside diameter of the coated cable, thereby vulcanizing said outer coating and reducing the thickness thereof, whereupon
    c. said steel cable is covered with a flexible, continuous, vulcanized outer coating of rubber, and wherein the diameter of the covered cable is significantly less than prior to passage thereof through said die.

2. A process as in claim 1 wherein said coated cable is compressed at a pressure of at least about 700 psi during passage through said die.

3. A process as in claim 1 wherein the diameter of said coated cable is reduced at least about 10% by compression and heating during passage through said die.

4. A process as in claim 1 wherein the pressure and temperature applied to said coated cable, and the time at which the cable is exposed thereto, are selected to provide a produced cable with a vulcanized coating thereon having a Shore A Durometer hardness of at least about 65.

5. A process as in claim 1 wherein the coating of vulcanized rubber compound is applied to the cable by:
 a. pulling said steel cable through the extrusion orifice of a polymer extruder, and
 b. simultaneously extruding said vulcanizable rubber compound from said orifice and onto the outer surface of said cable.

6. A process as in claim 1 and further comprising the following continuous steps:
 a. washing said steel cable with a degreasing liquid prior to application of said outer coating thereto,
 b. drying said cable after said washing thereof,
 c. passing the washed and dried cable through the orifice of a polymer extruder,
 d. simultaneously extruding said vulcanizable rubber compound from said orifice onto the outer surfce of the cable, thus coating the cable and providing said coated cable, and
 e. thereafter passing said coated cable through said heated die.

7. A process as in claim 6 wherein a rubber-to-metal bonding agent is applied to the washed and dried cable prior to application of the vulcanizable rubber compound thereto.

8. A process as in claim 7 wherein a primer is applied to the washed and dried cable prior to application of the rubber-to-metal bonding agent thereto.

* * * * *